Patented May 30, 1933

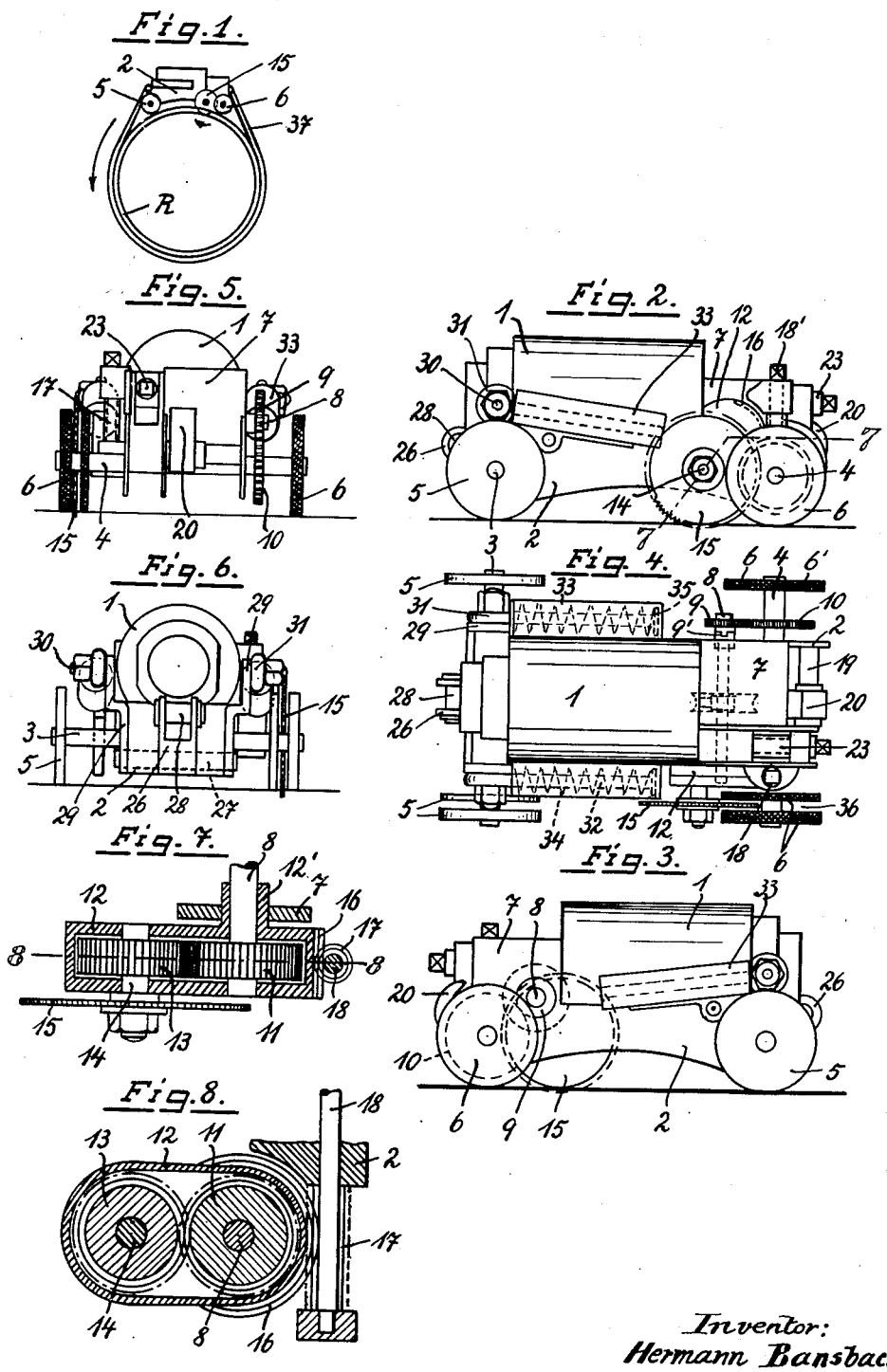

1,912,058

UNITED STATES PATENT OFFICE

HERMANN BANSBACH, OF CANNSTATT, GERMANY

PIPE CUTTING APPLIANCE

Application filed February 9, 1932, Serial No. 591,876, and in Germany March 6, 1931.

The invention relates to appliances for cutting pipes of large diameter, for example drain pipes, gas mains and water mains.

It is a common practice to use for the cutting, of such pipes, when they have to be cut while buried in the soil or lying in a trench, a chain having a series of cutters attached thereto, the chain being slung or looped round the pipe and one end of it being pulled so that the cutters are moved round the circumference, to make the cut. With such appliances the cutters receive no actuating movement except that which is imparted by moving them with the chain, and the cutting operation is generally very slow.

The object of my invention is to provide an appliance which cuts much more quickly and also makes a cleaner cut. I use a carriage, which is held upon the pipe by a belt and is adapted to travel round the pipe, and on this carriage I provide driving mechanism, which propels the carriage and also drives the shaft of a cutting tool, the tool actuated by this mechanism making the cut while the carriage is travelling round the pipe. I prefer to make the tool shaft adjustable in relation to a carriage track, for regulating the depth of the cut.

An embodiment of the invention is illustrated in the accompanying drawing.

Fig. 1 shows the carriage in operation upon a pipe;

Fig. 2 is an elevation of the carriage to a larger scale, and

Fig. 3 is an elevation of the opposite side thereof,

Fig. 4 being a plan view;

Fig. 5 is a rear view of the carriage, and

Fig. 6 is a front view.

Fig. 7 is a section on the line 7—7 of Fig. 2, to an enlarged scale, and

Fig. 8 is a section on the line 8—8 of Fig. 7.

An electromotor 1 is mounted on a carriage 2 having axles, 3, 4 for front wheels 5 and rear wheels 6. Behind the motor there is a gear case 7, from the side of which the ends of a worm shaft 8 project. One end of this shaft has on it a clutch $9^1$ for driving a pinion 9, which meshes with a gear wheel 10 fixed to the rear axle 4. The rims $6^1$ of the rear wheels 6 are ribbed or roughened to enable them to obtain a hold on the circumference of the pipe R to be cut. To the other end of the shaft 8 is fixed a gear wheel 11 (Figs. 7 and 8) enclosed in a housing 12, which is mounted on the shaft 8 by means of a bearing $12^1$ enabling it to be rocked. In this housing there is also a gear wheel 13 meshing with the gear wheel 11, the wheel 13 being fixed to a shaft 14 which projects from one side of the housing and carries the cutting tool 15. The tool is a circular saw or disk cutter, and is removable, to enable it to be exchanged for another tool. The housing 12 is provided externally with worm teeth 16 meshing with a worm 17 on a vertical spindle 18 mounted in the frame of the carriage 2. The top end $18^1$ of the spindle is squared, to enable the spindle to be turned by means of a key.

Part of the circumference of the cutting tool 15 lies in a deep circumferential channel 36 made in one of the rear wheels 6, this wheel consisting in effect of two portions spaced apart to leave the channel for the cutter, and the front wheel 5 on the same side is similarly made, its channel being in line with that of the rear wheel. These divided wheels are consequently able to rest on the pipe on both sides of the cut made by the tool. The channel in the rear wheel enables the shaft of the cutter to be placed close to this wheel, which is desirable as it facilitates making the cut in a true line. The direction of rotation of the cutting tool 15 about its axis is opposite to the direction of rotation of the carriage wheels about their axes, as is indicated by the arrows in Fig. 1.

The carriage 2 is held upon the pipe R by means of a chain or belt 37, which is slung round the pipe and has its ends attached to the front and rear of the carriage. The chain is a roller chain, so that it travels easily on the circumference of the pipe. For attaching one end of the chain to the carriage there is a spindle 19 on the carriage, with a hook 20 (Figs. 3, 4 and 5), and the spindle can be rotated with the hook by means of worm gear 23, for making the chain taut. At the other end the chain 37 is attached to a pin 28 carried by a forked lever 26 mounted on a shaft 27 which has arms 29 fixed to its ends, and the arms are connected by pivots 30 to eyes 31 at the ends of rods 32. The rods 32 are enclosed in housings 33 at the sides of the motor casing, and inside the housings springs 34 are coiled upon the rods, abutting against collars 35 at the rear ends of the rods, so that they maintain an elastic pull on the arms 29 and consequently upon the chain 37.

For cutting a pipe buried in soil the soil is cleared away around a portion of the pipe where the cut is to be made, the clearance being sufficient to enable the carriage 2 to travel round the pipe. The carriage is then placed on the pipe, and the belt 37 is slung round the pipe and attached to the carriage, the spindle 23 being turned as required to make the chain taut. The springs 34 allow the chain to yield if yielding is required to enable the carriage to pass over irregular portion of the pipe circumference. The cutting tool 15 is then lowered, by turning the spindle 18, till the edge of the tool rests on the pipe. Then the motor is started, with the clutch of the wheel 9, disengaged so that the motor drives the tool without driving the carriage. The spindle 18 is then again turned for making the tool bite into the pipe to the depth required for cutting through the pipe wall, and then the clutch is engaged for driving the wheels 8 and 9, and propelling the carriage. The carriage then travels slowly round the pipe, and the tool makes a clean cut.

It will be understood that I may use a compressed air motor or internal combustion motor instead of an electromotor, and also that I may have a motor separate from the carriage with a flexible shaft connecting it to driving gear on the carriage.

What I claim as my invention and desire to secure by Letters Patent of the United States is:—

1. A pipe cutting appliance for stationary pipes comprising a carriage adapted to travel on the pipe about the circumference thereof, a belt adapted to hold said carriage in contact with the pipe during its travel, a cutting tool shaft mounted on said carriage, and driving mechanism on said carriage adapted to rotate said shaft and propel said carriage.

2. A pipe cutting appliance for stationary pipes comprising a carriage adapted to travel on the pipe about the circumference thereof, a belt adapted to hold said carriage in contact with the pipe during its travel, a cutting tool shaft mounted on said carriage, and a motor and driving mechanism on said carriage for rotating said shaft and propelling said carriage.

3. A pipe cutting appliance for stationary pipes comprising a carriage adapted to travel on the pipe about the circumference thereof, a belt adapted to hold said carriage in contact with the pipe during its travel, a cutting tool shaft mounted on said carriage, and driving mechanism on said carriage for rotating said shaft and propelling said carriage, said driving mechanism including a clutch whereby the propelling part of said mechanism can be put into and out of operation alternatively.

4. A pipe cutting appliance for stationary pipes comprising a carriage adapted to travel on the pipe about the circumference thereof, a belt adapted to hold said carriage in contact with the pipe during its travel, a holder pivoted on said carriage, adapted to be rocked towards and away from the track of said carriage, a cutting tool shaft mounted on said holder, and driving mechanism on said carriage for rotating said shaft and propelling said carriage.

5. A pipe cutting appliance for stationary pipes comprising a carriage adapted to travel on the pipe about the circumference thereof, a belt adapted to hold said carriage in contact with the pipe during its travel, a holder pivoted on said carriage, adapted to be rocked towards and away from the track of said carriage, a cutting tool shaft mounted on said holder, and driving mechanism on said carriage comprising gear wheels adapted to rotate said shaft and propel said carriage, said pivoted holder being a housing enclosing the gear wheels for rotating the cutting tool shaft.

6. A pipe cutting appliance for stationary pipes comprising a carriage having wheels and adapted to travel on the pipe about the circumference thereof, a belt adapted to hold said carriage in contact with the pipe during its travel, a cutting tool shaft mounted on said carriage, and driving mechanism on said carriage for rotating said shaft and propelling said carriage, the direction of rotation of said shaft being opposite to the direction of rotation of the carriage wheels.

7. A pipe cutting appliance for stationary pipes comprising a carriage having wheels and adapted to travel on the pipe about the circumference thereof, a belt adapted to hold said carriage in contact with the pipe during its travel, a cutting tool shaft mounted on said carriage, a disk shaped cutting tool fixed to said shaft, and driving mechanism on said carriage for rotating said shaft and propelling said carriage one of the wheels of said carriage having a circumferential channel adapted to accommodate a portion of said disk shaped cutting tool.

HERMANN BANSBACH.